US012664822B2

(12) United States Patent
Chavali

(10) Patent No.: US 12,664,822 B2
(45) Date of Patent: Jun. 23, 2026

(54) SYSTEMS AND METHODS FOR DETERMINING USER INTENT BASED ON IMAGE-CAPTURED USER ACTIONS

(71) Applicant: Verizon Patent and Licensing Inc., Basking Ridge, NJ (US)

(72) Inventor: Saikiran N. Chavali, Pune (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 736 days.

(21) Appl. No.: 18/157,267

(22) Filed: Jan. 20, 2023

(65) Prior Publication Data

US 2024/0249557 A1 Jul. 25, 2024

(51) Int. Cl.
| | |
|---|---|
| *H04L 51/04* | (2022.01) |
| *G06F 3/16* | (2006.01) |
| *G06V 40/10* | (2022.01) |
| *G06V 40/20* | (2022.01) |
| *G10L 15/22* | (2006.01) |

(52) U.S. Cl.
CPC .............. *G06V 40/28* (2022.01); *G06F 3/167* (2013.01); *G06V 40/10* (2022.01); *G10L 15/22* (2013.01); *G10L 2015/225* (2013.01)

(58) Field of Classification Search
USPC ........... 382/100–159; 701/1–120, 29.1–32.4, 701/400–541, 300–302; 704/1–275; 706/900–903, 1–62
See application file for complete search history.

(56) References Cited

U.S. PATENT DOCUMENTS

| | | | | |
|---|---|---|---|---|
| 11,055,355 B1* | 7/2021 | Monti | ............... | G06F 16/90332 |
| 12,388,773 B2* | 8/2025 | Le | ............................ | H04L 51/02 |
| 2022/0197952 A1* | 6/2022 | Hennig | ................... | H04L 51/02 |
| 2022/0245880 A1* | 8/2022 | Thielen | ................. | G06T 19/006 |
| 2022/0253609 A1* | 8/2022 | Tiwari | ................. | G06N 3/0475 |
| 2023/0214710 A1* | 7/2023 | Rakshit | ................... | H04L 51/02 706/12 |
| 2024/0202468 A1* | 6/2024 | Chekuri | ................. | G06F 40/45 |
| 2025/0095302 A1* | 3/2025 | Wetmore | ............... | G06F 3/013 |

OTHER PUBLICATIONS

Maya Audrey; Systems And Methods For Predicting Pedestrian Intent; 2021 (Year: 2021).*

* cited by examiner

*Primary Examiner* — Marcellus J Augustin

(57) ABSTRACT

A device may process an image, with a machine learning model, to identify a user in the image and may generate a user identifier for the user. The device may process a portion of the image that includes the user, with the machine learning model, to identify pose points for the user. The device may calculate pose angles of the user based on the pose points and may determine an action of the user based on the pose angles. The device may associate the action with an action identifier, may map the action to an intent, and may generate an intent identifier for the intent. The device may provide the intent to a conversational service and may receive a response from the conversational service. The device may map the response to the intent based on the intent identifier and may provide the response to the user.

20 Claims, 12 Drawing Sheets

100 ⟶

Camera 110

120 Receive an image of users from a camera associated with a user device

User device 105

Users

Backend system 115

100

Backend system 115

120

Receive an image of users from a camera associated with a user device

Camera 110

User device 105

Users

Figure 1B:
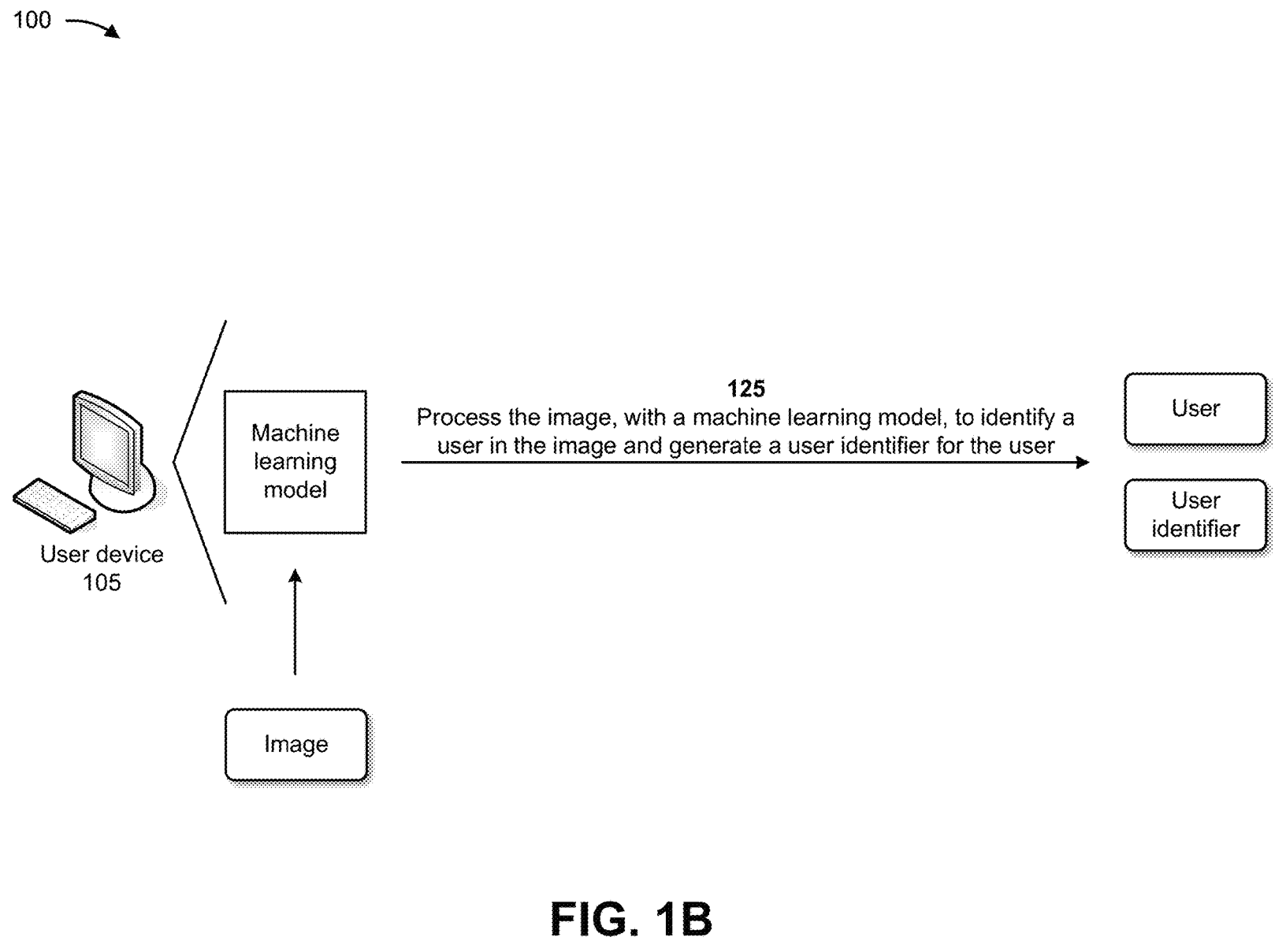

100

125

Process the image, with a machine learning model, to identify a user in the image and generate a user identifier for the user User User identifier Machine learning model Image User device 105

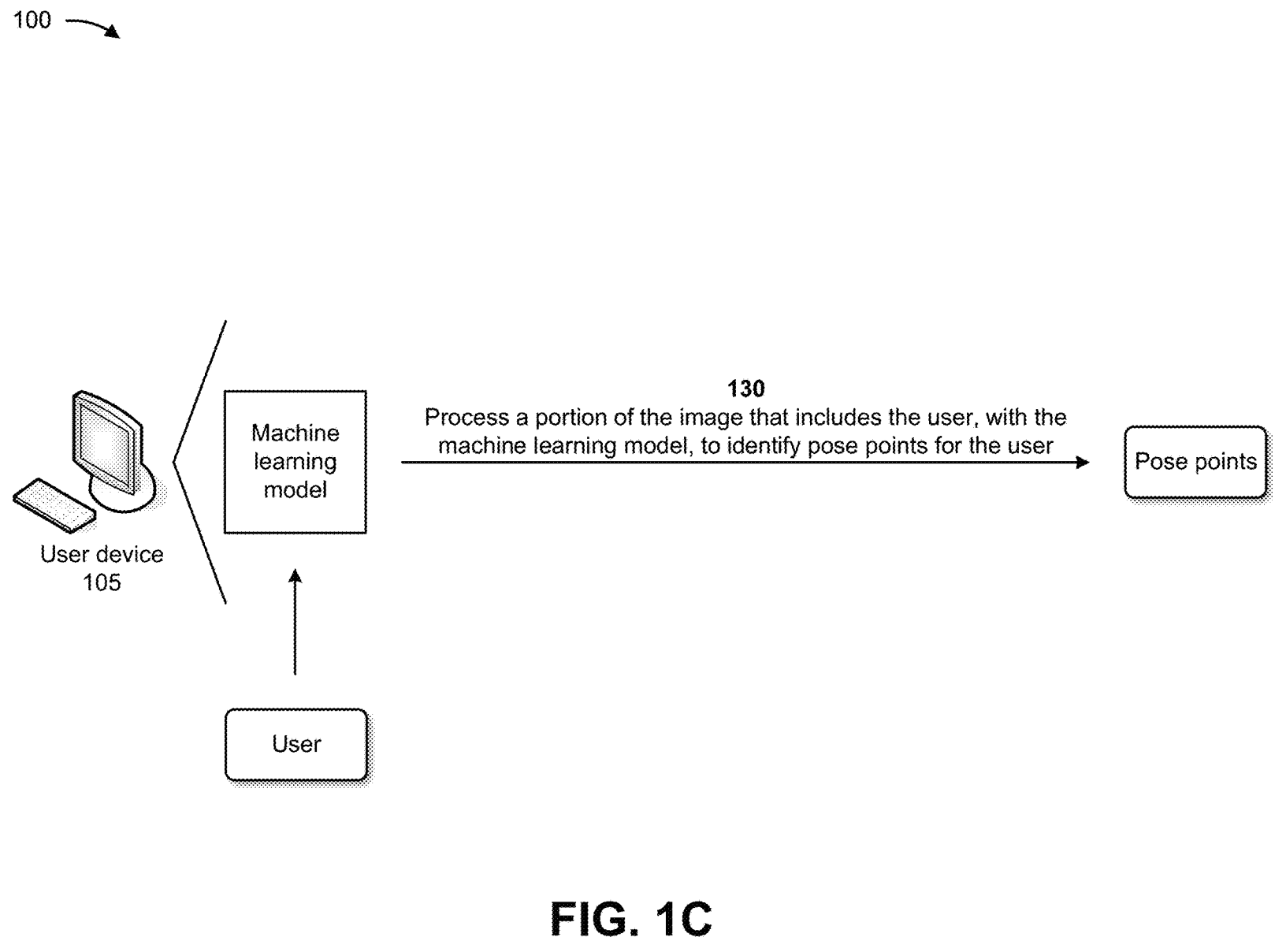

Pose points

130
Process a portion of the image that includes the user, with the
machine learning model, to identify pose points for the user Machine
learning
model User User device
105

FIG. 1C

140
Determine an action of the user based on the pose angles and associate the action with an action identifier Action Action identifier Generate a classified pose Pose angles User device 105

100

Figure 1F:
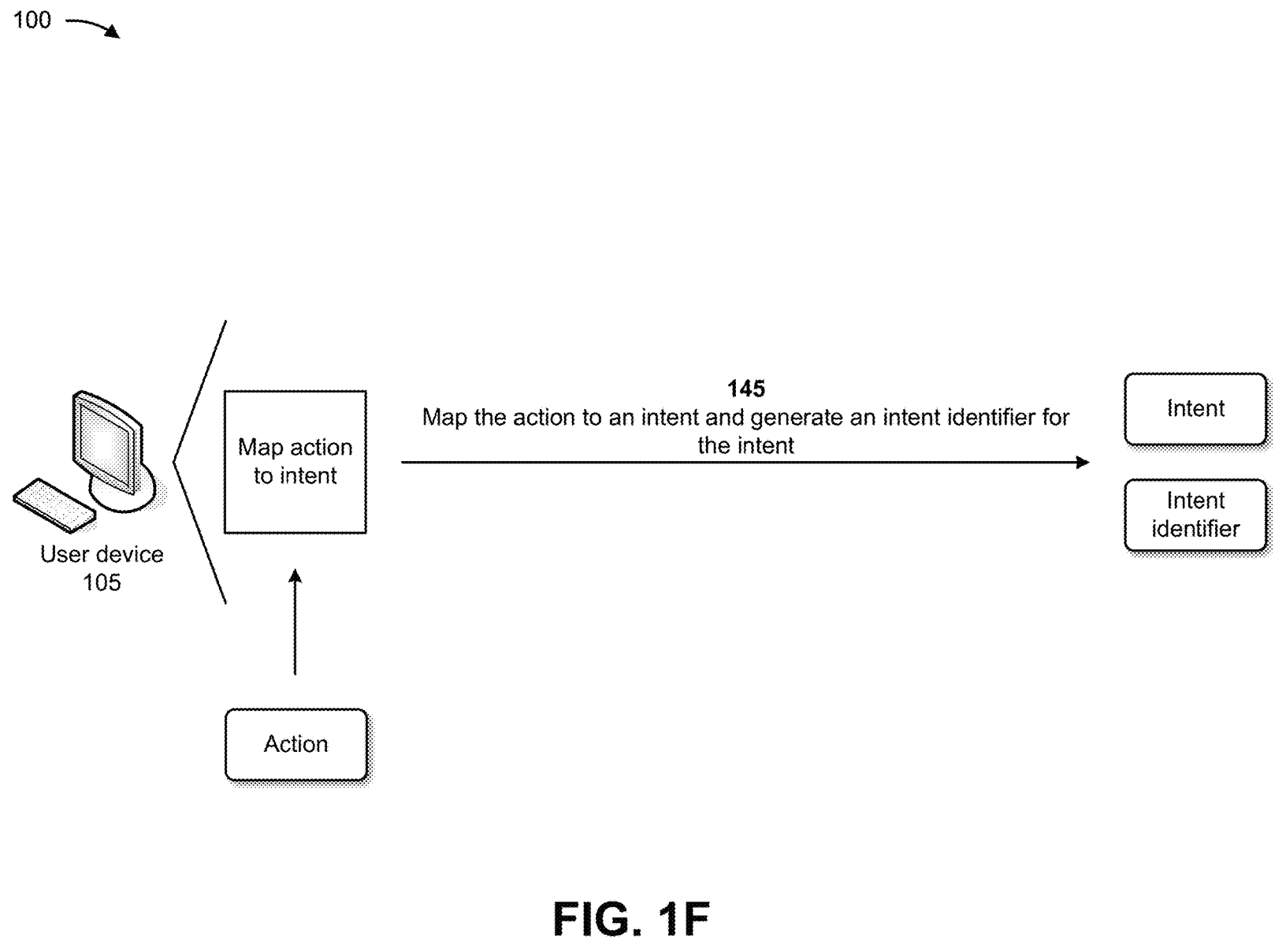

100

Intent

Intent
identifier

145
Map the action to an intent and generate an intent identifier for
the intent Map action
to intent Action User device
105

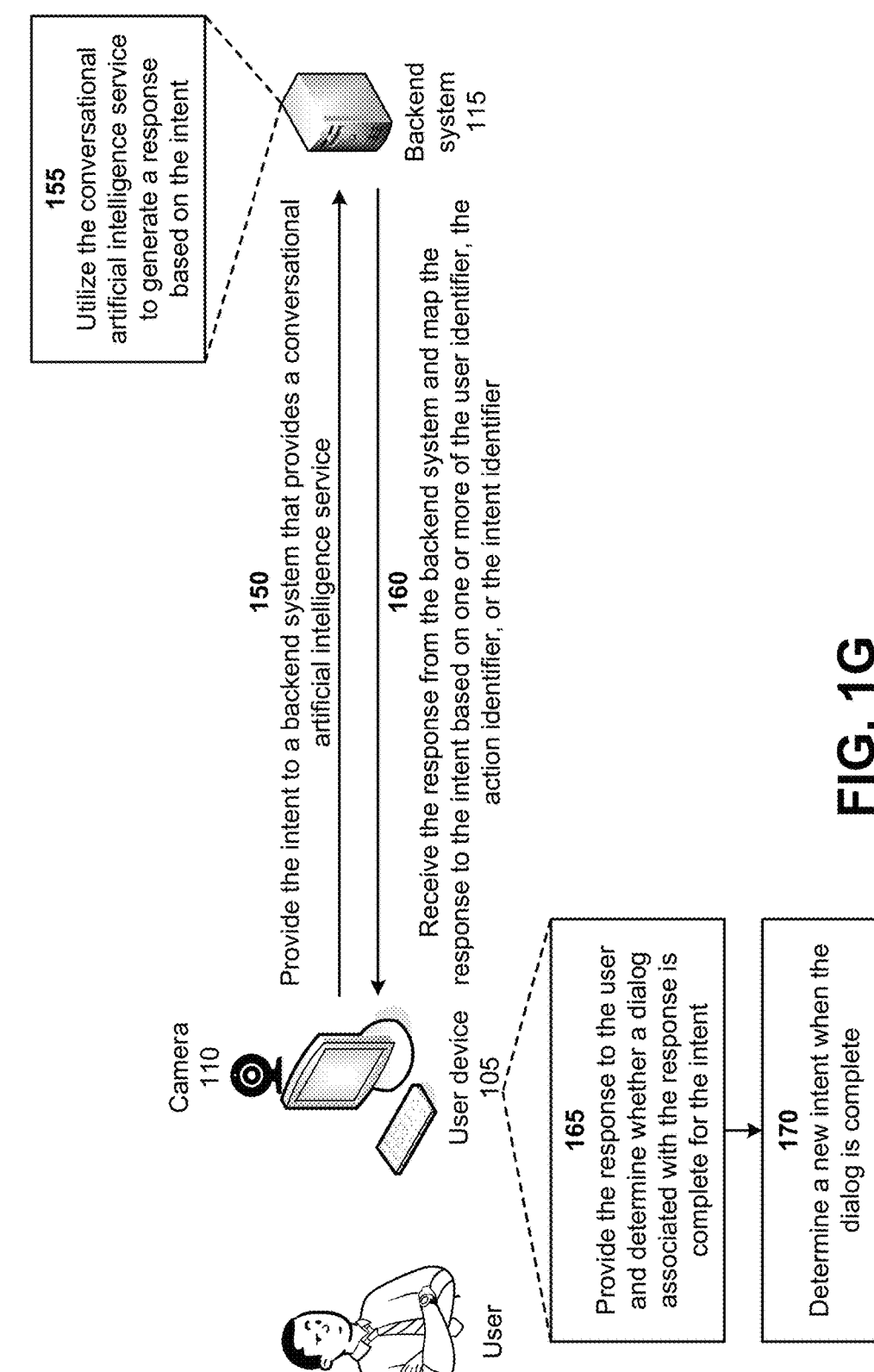

155
Utilize the conversational artificial intelligence service to generate a response based on the intent Backend system
115

150
Provide the intent to a backend system that provides a conversational artificial intelligence service

160
Receive the response from the backend system and map the response to the intent based on one or more of the user identifier, the action identifier, or the intent identifier Camera
110

User device
105

165
Provide the response to the user and determine whether a dialog associated with the response is complete for the intent

170
Determine a new intent when the dialog is complete

User

FIG. 1G

SYSTEMS AND METHODS FOR DETERMINING USER INTENT BASED ON IMAGE-CAPTURED USER ACTIONS

BACKGROUND

Intent plays a key role in conversational artificial intelligence for any kind of virtual assistant (e.g., a chatbot). To trigger an intent, a user has to provide a word or a sentence to the chatbot via an audio input or a text input. The chatbot may respond back to the user in the form of a question and answer or as a dialog conversation. The chatbot may execute a decision tree based on the dialog conversation between the user and the chatbot.

BRIEF DESCRIPTION OF THE DRAWINGS

FIGS. 1A-1H are diagrams of an example associated with determining user intent based on image-captured user actions.

DETAILED DESCRIPTION OF EXAMPLE EMBODIMENTS

Figure 1A:
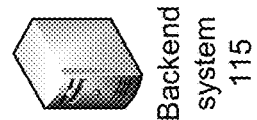
Figure 1A:
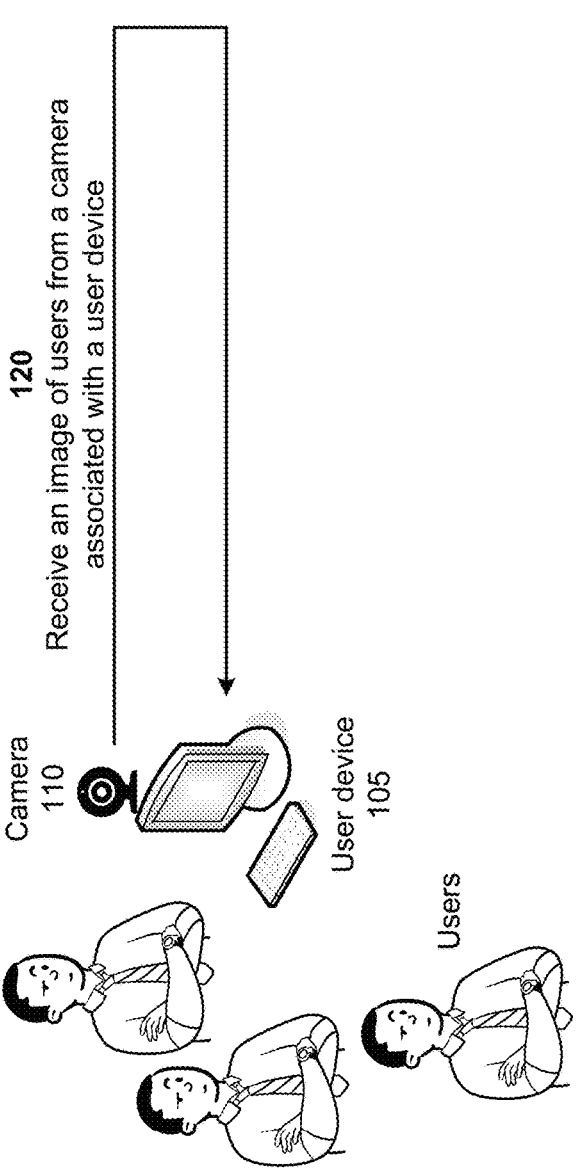

The following detailed description of example implementations refers to the accompanying drawings. The same reference numbers in different drawings may identify the same or similar elements.

Existing virtual assistant or chatbot systems require a user to initiate a conversation with the chatbot. There may be scenarios where the user might require assistance (e.g., based on the user's actions) but the chatbot may not know that the user requires assistance until the user starts a conversation with the chatbot. This may result in a lost business opportunity associated with the user (e.g., learning more information about a product and/or a service for the user). Chatbots are intent driven, and the user's audio or text input is a triggering point for the intent to cause a decision tree to execute. For example, a user may be physically shopping in a store and may need a store employee's assistance. The store employee may be attending to another customer, and an opportunity to serve the user is lost (e.g., the user may leave the store). In another example, the user may utilize digital channels (e.g., an online purchasing system) and may be unable to move forward in the digital channels. However, a chatbot may not know a current position of the user in the digital channels and may be unable to assist the user until the user initiates a conversation with the chatbot.

Thus, current techniques for utilizing a virtual assistant or chatbot may consume computing resources (e.g., processing resources, memory resources, communication resources, and/or the like), networking resources, and/or other resources associated with failing to assist a user in a store with a product and/or a service, losing a customer associated with a store, failing to provide recommendations to a user of an online purchasing system due to poor insights, providing incorrect recommendations to a user of an online purchasing system due to the poor insights, and/or the like.

Some implementations described herein provide a user device that determines user intent based on image-captured user actions. For example, the user device may receive an image of one or more users from a camera associated with the user device and may process the image, with a machine learning model, to identify a user in the image of the one or more users. The user device may generate a user identifier for the user and may process a portion of the image that includes the user, with the machine learning model, to identify pose points for the user. The user device may calculate pose angles of one or more of hands, arms, legs, or a waist of the user based on the pose points and may determine an action of the user based on the pose angles. The user device may associate the action with an action identifier and may map the action to an intent. The user device may generate an intent identifier for the intent and may provide the intent to a conversational artificial intelligence service. The user device may receive, from the conversational artificial intelligence service, a response and may map the response to the intent based on one or more of the user identifier, the action identifier, or the intent identifier. The user device may provide the response to the user.

In this way, the user device determines user intent based on image-captured user actions. For example, the user device may automatically determine an intent of a user for use in conversational artificial intelligence for chatbots, virtual assistants, digital human bots, and/or the like, based on the user actions. The user device may track actions of a single user or multiple users in the physical world or for any digital channel using machine learning models and using a single camera source. The user device may utilize the intent to provide a virtual assistant (e.g., in stores) that promptly helps users by providing details about products and/or services, by easing the physical shopping experience via automatic addition to a cart, by promptly providing support in troubleshooting scenarios, and/or the like. Thus, the user device may conserve computing resources, networking resources, and/or other resources that would have otherwise been consumed by failing to assist a user in a store with a product and/or a service, losing a business opportunity associated with a user in a store, failing to provide recommendations to a user of an online purchasing system due to poor insights, providing incorrect recommendations to a user of an online purchasing system due to the poor insights, and/or the like.

FIGS. 1A-1H are diagrams of an example 100 associated with determining user intent based on image-captured user actions. As shown in FIGS. 1A-1H, example 100 includes a user device 105 (e.g., associated with users), a camera 110, and a backend system 115. In some implementations, the camera 110 may be included in the user device 105, separate from the user device 105, and/or the like. Further details of the user device 105, the camera 110, and the backend system 115 are provided elsewhere herein.

As shown in FIG. 1A, and by reference number 120, the user device 105 may receive an image of users from the camera 110 associated with the user device 105. For example, the camera 110 may capture images (e.g., video) of the users while the users are near the user device 105. The camera 110 may provide the images to the user device 105, and the user device 105 may receive the images. In some implementations, the user device 105 may continuously receive the images from the camera 110, may periodically receive the images from the camera 110, and/or the like. The user device 105 may process each of the images as described below in connection with a single image.

As shown in FIG. 1B, and by reference number 125, the user device 105 may process the image, with a machine learning model, to identify a user in the image and may generate a user identifier for the user. For example, the user device 105 may include or have access to a machine learning model. In some implementations, the machine learning model may include a neural network model, such as an artificial neural network (ANN) model, a convolution neural network (CNN) model, or a recurrent neural network (RNN) model. The user device 105 may train the machine learning model, may receive a trained machine learning model, may update the machine learning model, may provide information for updating the machine learning model to another device that updates the machine learning model, and/or the like. Further details of training the machine learning model are described below in connection with FIG. 2.

In some implementations, the user device 105 may utilize the machine learning model to identify each of the users and key markers (e.g., points) of each of the users, based on the image. Each key marker may be specified by a real-valued pair (x, y) in a space of pixel indices and may identify different locations on a user. For example, the key markers may include points identifying a head, hands, arms, legs, a waist, and/or the like of the user. The user device 105 may utilize the key markers and/or the machine learning model to track each of the users in additional images captured by the camera 110. Thus, the user device 105 may track movement of the user in an area captured by the camera 110 over time.

In some implementations, the user device 105 may generate the user identifier for the user and may associate the key markers of the user with the user identifier. In some implementations, the user device 105 may generate user identifiers for each of the users captured by the camera 110 in the image. In such implementations, the user device 105 may generate a user identifier for each of the users. Each of the user identifiers may include a unique number, a string of unique characters, a string of unique numbers and characters, and/or the like. The user device 105 may prioritize the user identifier of the user and the user identifiers of the other users based on locations and/or actions of the user and the other users. In some implementations, when there are multiple users performing actions, the user device may create a priority map or queue based on the user identifiers. For example, if the user is holding a product in an aisle and the other users are just walking in the aisle, the user device 105 may prioritize the user over the other users (e.g., since the user may be close to purchasing the product). The user device 105 may continuously monitor the actions of the users over time and may update the priority map based on changing actions of the users over time. The user device 105 may utilize the priority map to conduct conversations with the users and may wait for a current conversation to be completed before triggering another conversation based on the priority map. The user device 105 may remove a particular user identifier from the priority map when a particular user associated with the particular user identifier is no longer captured by the camera 110.

In some implementations, when generating the user identifier for the user, the user device 105 may generate a unique number for the user identifier and may determine points associated with anatomical markers or reference points of the user, e.g., the shoulders of the user. The user device 105 may calculate a midpoint of the points associated with the shoulders of the user and may track movement of the midpoint for multiple time increments (e.g., one second time increments). The user device 105 may determine whether the midpoint moved to a new midpoint for a threshold time based on tracking movement of the midpoint and may associate the new midpoint with the user identifier.

As shown in FIG. 1C, and by reference number 130, the user device 105 may process a portion of the image that includes the user, with the machine learning model, to identify pose points for the user. For example, the user device 105 may utilize the machine learning model to identify the pose points for the user, based on the portion of the image that includes the user. In some implementations, the pose points may include points identifying a head of the user, a left shoulder of the user, a right shoulder of the user, a left elbow of the user, a right elbow of the user, a left hand of the user, a right hand of the user, a left ear of the user, a right ear of the user, a nose of the user, a left eye of the user, a right eye of the user, a waist of the user, a left leg of the user, a right leg of the user, and/or the like. The user device 105 may utilize portions of additional images that include the user and the machine learning model to track the pose points of the user in the additional images. Thus, the user device 105 may capture movement of the pose points of the user in the area captured by the camera 110 over time.

Figure 1D:
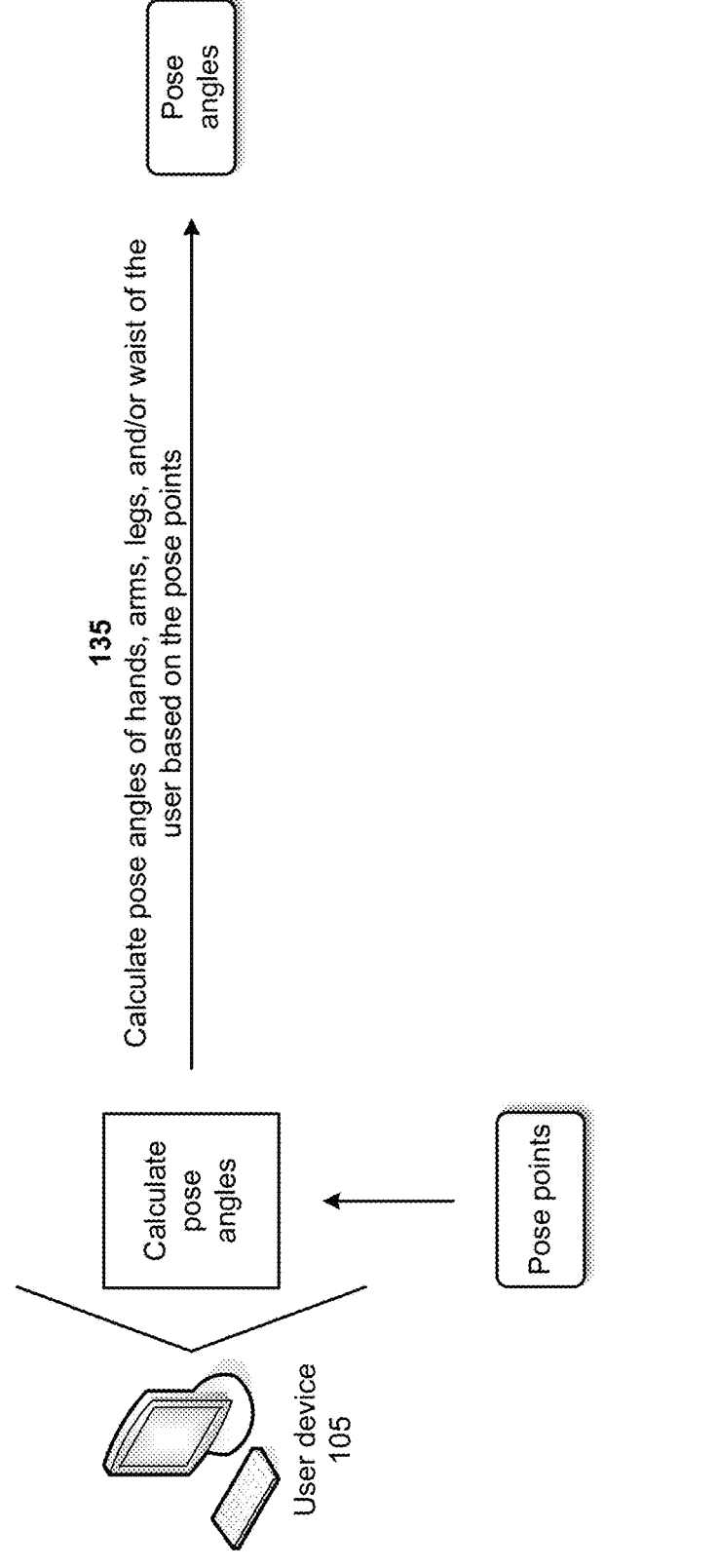

As shown in FIG. 1D, and by reference number 135, the user device 105 may calculate pose angles of hands, arms, legs, and/or waist of the user based on the pose points. For example, the user device 105 may calculate pose angles for pose points associated with the head of the user, the shoulders of the user, the elbows of the user, the hands of the user, the arms of the user, the waist of the user, the legs of the user, the ears of the user, the nose of the user, the eyes of the user, and/or the like. In some implementations, to calculate pose angles associated with picking up a product, the user device 105 may detect pose points associated with an elbow, a hand, and a shoulder of the user and may calculate an angle formed between the elbow, the hand, and the shoulder based on the pose points. If the angle is greater than or equal to a minimum threshold value and less than or equal to a maximum threshold value, the user device 105 may determine that the user picked up a product. If the angle is less than the minimum threshold value or greater than the maximum threshold value, the user device 105 may determine that the user did not pick up the product. The minimum threshold value and the maximum threshold value may be determined based on a distance of the user from the camera 110.

In some implementations, to calculate pose angles associated with wearing a product on the wrist (e.g., a watch, a bracelet, and/or the like), the user device 105 may detect pose points associated with an elbow, a hand, and a shoulder of the user and may calculate an angle formed between the elbow, the hand, and the shoulder based on the pose points. If the hand is bending towards the user's body and if the user is trying to wear a product on the left hand, the user device 105 may calculate a Euclidean distance between a right wrist and a left wrist of the user. If the Euclidean distance is less than a threshold distance, the user device 105 may determine that the user is wearing a product. If the Euclidean distance is greater than or equal to the threshold distance, the user device 105 may determine that the user is not wearing a product.

In some implementations, to calculate pose angles associated with wearing a product on the head (e.g., headphones), the user device 105 may detect pose points associated with an elbow, a hand, and a shoulder of the user and may calculate an angle formed between the elbow, the hand, and the shoulder based on the pose points. If the angle is less than a threshold value, the user device 105 may calculate a Euclidean distance between a wrist (e.g., a right wrist) and an ear (e.g., a right ear) of the user. If the Euclidean distance is less than a threshold distance, the user device 105 may determine that the user is wearing a product on the head. If the Euclidean distance is greater than or equal to the threshold distance, the user device 105 may determine that the user is not wearing a product on the head.

Figure 1E:
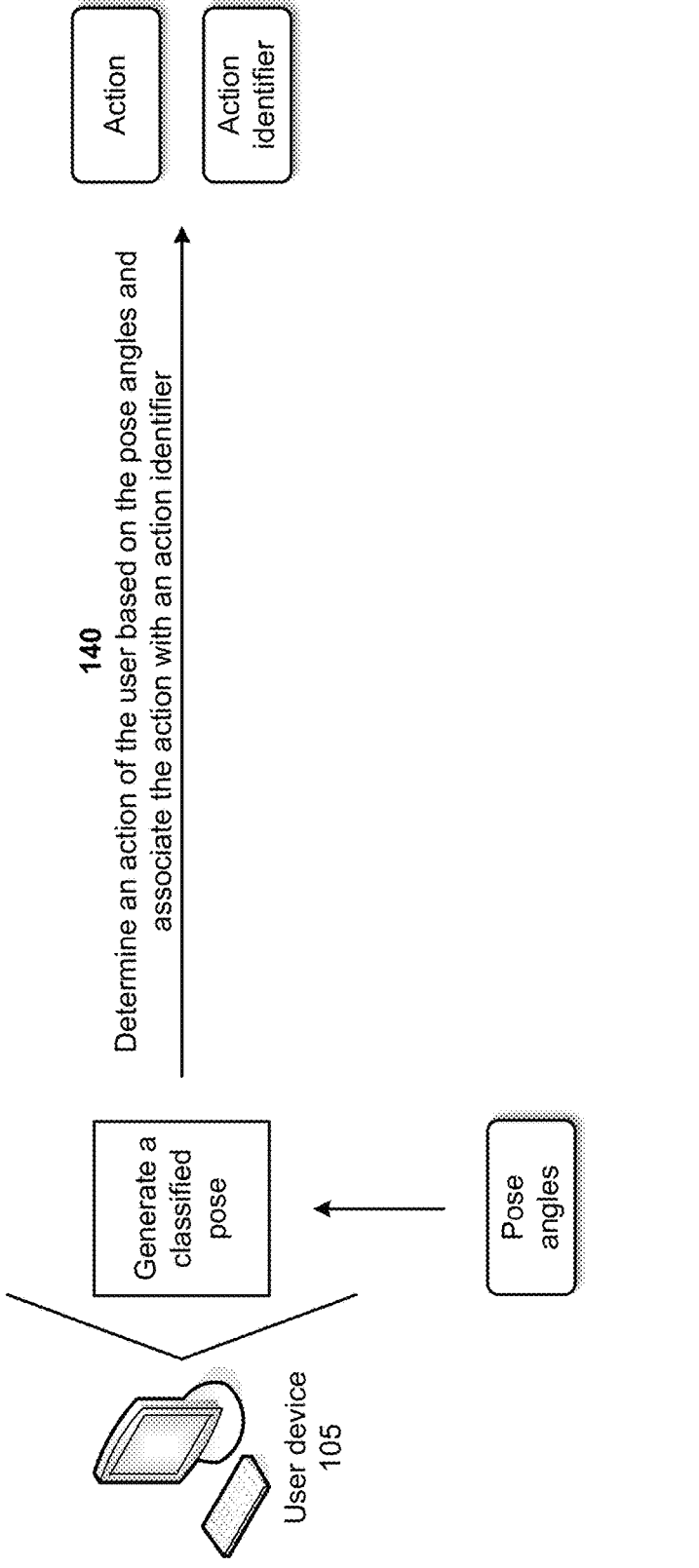

As shown in FIG. 1E, and by reference number 140, the user device 105 may determine an action of the user based on the pose angles and may associate the action with an action identifier. For example, the user device 105 may determine whether the user picked up a product based on the pose angles, whether the user is wearing a product on the wrist based on the pose angles, whether the user is wearing a product on the head based on the pose angles, whether the user is waving based on the pose angles, whether the user is observing a product based on the pose angles, and/or the like. In some implementations, the user device 105 may determine that the action is the user picking up a product when the angle formed between the elbow, the hand, and shoulder is greater than or equal to the minimum threshold value and less than or equal to the maximum threshold value. In some implementations, the user device 105 may determine that the action is the user wearing a product on the wrist when the Euclidean distance between a right wrist and a left wrist of the user is less than a threshold distance. In some implementations, the user device 105 may determine that the action is the user wearing a product on the head when the Euclidean distance between a wrist and an ear of the user is less than a threshold distance.

In some implementations, the user device 105 may utilize the pose points and/or the pose angles to determine a position of the user relative to an object (e.g., a product on a shelf). For example, the user device 105 may calculate a body marker of the user based on a midpoint of the shoulders of the user and may create a matrix of virtual boxes based on the body marker. The user device may eliminate virtual boxes that do not support a position of the user relative to a location of an object. In some implementations, the user device 105 may utilize the position of the user relative to an object when determining the action of the user. For example, if the user picks up a product, the user device 105 may calculate a distance between the wrist and the nose of the user. If the distance is less than a threshold value, the user device 105 may determine whether the body marker intersects with a virtual box mapped to a location of the product. If the body marker intersects with the virtual box, the user device 105 may determine that the user picked up the product.

In some implementations, the user device 105 may associate the action with the action identifier. The action identifier may include a unique number, a string of unique characters, a string of unique numbers and characters, and/or the like. If the user device 105 detects multiple actions of the user, the user device 105 may associate each of the actions with an action identifier and may prioritize the action identifiers based on the actions. For example, the action of wearing a product may take priority over the action of picking up a product.

As shown in FIG. 1F, and by reference number 145, the user device 105 may map the action to an intent and may generate an intent identifier for the intent. For example, the user device 105 may determine an intent of the user based on the action and may map the action to the intent. In some implementations, the user device 105 may continuously track the actions of the user (e.g., and the other users) in front of the camera 110 and may determine a location of the user and a location of an object (e.g., a product) based on the image. The user device 105 may determine a distance between the location of the user and the location of the object and may determine the intent of the user based on the distance. For example, if the distance is less than a threshold distance (e.g., indicating that the user is near the object or viewing the object), the user device 105 may determine that the user is interested in the object and/or viewing the object. If the distance is greater than or equal to the threshold distance, the user device 105 may determine that the user is not interested in the object and/or is not viewing the object. In this way, the user device 105 may map the location of the user in the real world to locations of objects in the real world and may utilize the mapping to determine the intent of the user.

In some implementations, the intent may be associated with the user viewing an object (e.g., a product), moving near an object, picking up an object, and/or the like. In some implementations, when mapping the action to the intent, the user device 105 may determine that the user is located at a particular location for a time period and may map the action to the intent based on determining that the user is located at a particular location for a time period.

In some implementations, the user device 105 may associate the intent with the intent identifier. The intent identifier may include a unique number, a string of unique characters, a string of unique numbers and characters, and/or the like. If the user device 105 detects multiple intents of the user, the user device 105 may associate each of the intents with an intent identifier and may prioritize the intent identifiers based on the intents. For example, the intent of moving toward a product may take priority over the intent of viewing a product.

As shown in FIG. 1G, and by reference number 150, the user device 105 may provide the intent to the backend system 115 that provides a conversational artificial intelligence service. For example, the user device 105 may determine whether the intent is sufficient to begin an artificial intelligence-based conversation with the user. In some implementations, the user device 105 may determine that the action and intent of the user is sufficient to begin an artificial intelligence-based conversation with the user when the user is near an object (e.g., a product) for a minimum focus time, picks up the object, wears the object, and/or the like. The focus time may include a quantity of time the user spends watching or staying at the location of the object. In this way, the user device 105 may determine that that the user is interested in the object and should begin conversing with the user about the object.

In some implementations, when the user device 105 determines that the action and intent of the user is sufficient to begin an artificial intelligence-based conversation with the user, the user device 105 may provide the intent to the backend system 115 that provides the conversational artificial intelligence service. The conversational artificial intelligence service may include a service that provides a digital human, a chatbot, a virtual assistant, and/or the like that converses with the user like a real human being.

As further shown in FIG. 1G, and by reference number 155, the backend system 115 may utilize the conversational artificial intelligence service to generate a response based on the intent. For example, the backend system 115 may receive the intent from the user device 105 and may utilize the conversation artificial intelligence service to generate the response based on the intent. In some implementations, the response may include a response associated with a digital human, a chatbot, a virtual assistant, and/or the like. In some implementations, the response may be associated with an object (e.g., a product) located a predetermined distance from the user. In some implementations, the response may include audio information, video information, image information, textual information, and/or the like. For example, if the action and/or the intent is associated with the user trying on a smartwatch, the backend system 115 may generate a response addressing the user trying on the smartwatch and providing initial details of the smartwatch (e.g., "I see you are trying on our AAA Smartwatch. This is our best-selling smartwatch, and it includes many features. Would you like to hear about some of the features?"). In another example, if the action and/or the intent is associated with the user wearing headphones, the backend system 115 may generate a response addressing the user wearing the headphones and providing initial details of the headphones (e.g., "You are wearing our BBB Headphones. These headphones provide quite an audio experience. Would you like try some of the different audio features?").

As further shown in FIG. 1G, and by reference number 160, the user device 105 may receive the response from the backend system 115 and may map the response to the intent based on one or more of the user identifier, the action identifier, or the intent identifier. For example, the backend system 115 may provide the response to the user device 105, and the user device 105 may receive the response. In some implementations, the user device 105 may map the response to the intent based on the user identifier, the action identifier, and/or the intent identifier. Mapping responses to intents may enable the user device 105 to track which users are associated with which responses received from the backend system 115 (e.g., when multiple intents and responses are being handled) so that the correct users receive the responses. Mapping the response to the intent may also enable the user device 105 and/or the backend system 115 to personalize a conversation with the user.

As further shown in FIG. 1G, and by reference number 165, the user device 105 provides the response to the user and may determine whether a dialog associated with the response is complete for the intent. For example, the user device 105 may display the response to the user (e.g., when the response is textual information or image information), may play audio of the response for the user (e.g., when the response is audio information), may play video of the response for the user (e.g., when the response is video information), and/or the like. In some implementations, the response may include a dialog with the user that enables the user device 105 to conduct a conversation with the user about the object (e.g., the product), via the conversational artificial intelligence service of the backend system 115. The dialog with the user may continue if the user device 105 determines that the dialog associated with the response is not complete for the intent. The dialog with the user may cease if the user device 105 determines that the dialog associated with the response is complete for the intent.

As further shown in FIG. 1G, and by reference number 170, the user device 105 may determine a new intent when the dialog is complete. For example, if the user device 105 determines that the dialog associated with the response is complete for the intent, the user device 105 may determine a new intent for the user based on additional actions of the user. The user device 105 may provide the new intent to the backend system 115 and may receive a new response from the backend system 115 based on the new intent. In some implementations, if the user device 105 determines that the dialog associated with the response is complete for the intent, the user device 105 may provide an intent of another user to the backend system 115 and may receive a response from backend system 115 based on the intent of the other user. The user device 105 may then enable a dialog between the other user and the conversational artificial intelligence service of the backend system 115.

In some implementations, the user device 105 may trigger user intents based on user actions identified using the camera 110 and may enable conversations with the user that assist in selling a product, troubleshooting a product, helping to add a product to a cart, and/or the like. The user device 105 may utilize a machine learning model to identify multiple user actions and to classify each of the user actions. The user device 105 may enable a dialog conversation with the user that replicates a real representative and the user based on the user's dialog and actions. This may enhance a user experience by providing support and assistance for products when an in-store representative may be unable to immediately assist the user with a product, when customer support may be unable to immediately assist the user with troubleshooting, and/or the like.

Figure 1H:
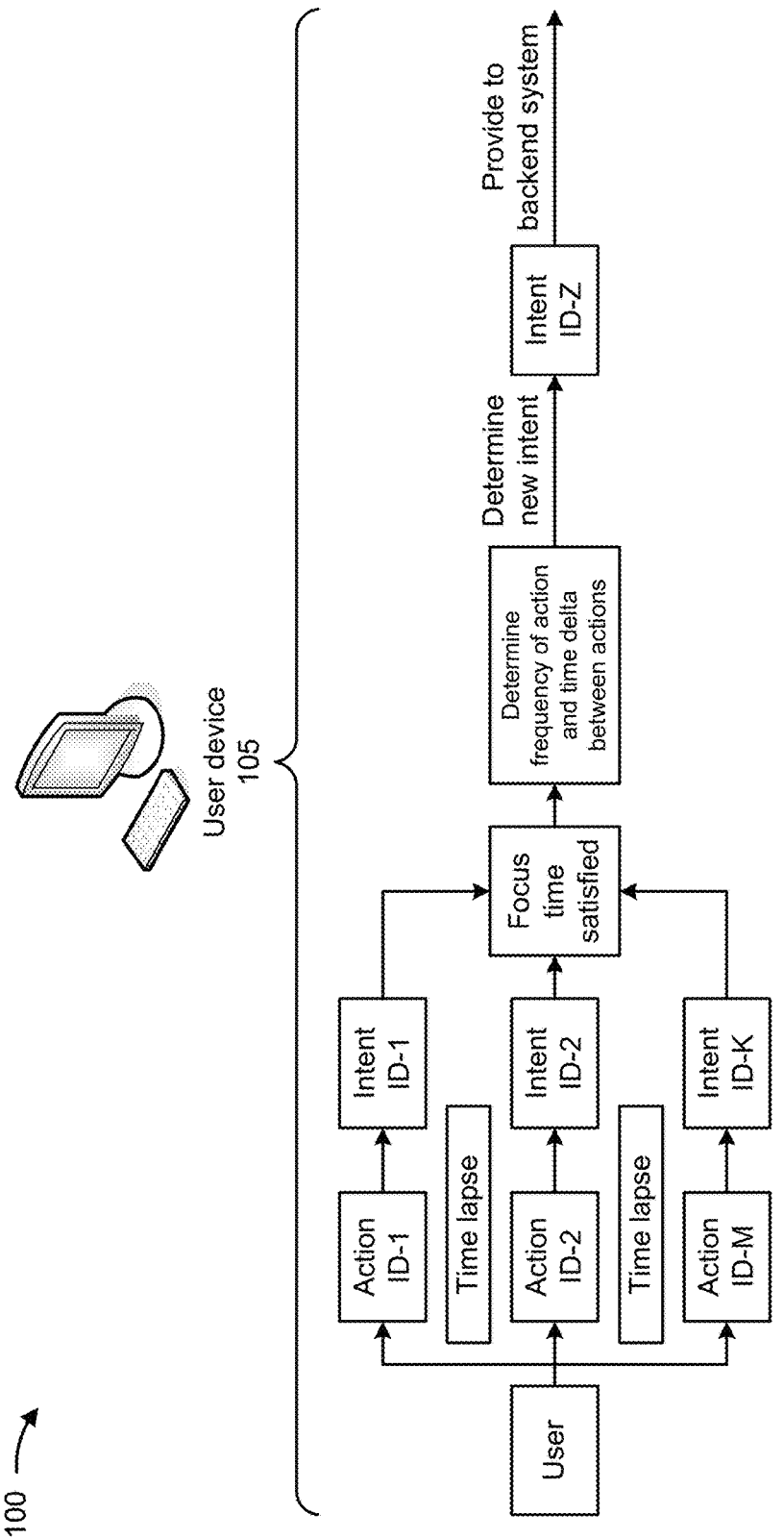

As shown in FIG. 1H, the user device 105 may determine multiple actions associated with the user over time and may associate action identifiers (e.g., Action ID-1 through Action ID-M) with the actions. The user device 105 may determine intents based on the multiple actions and may associate intent identifiers (e.g., Intent ID-1 through Intent ID-K). The user device 105 may determine whether a focus time is satisfied for each of the intents. When the focus time is satisfied for an intent, the user device 105 may determine a frequency of the actions associated with the intent and a time delta between the actions. When the time delta between the actions fails to satisfy a threshold value, the user device 105 may determine a new intent of the user (e.g., Intent ID-Z) and may provide the new intent to the backend system 115.

In this way, the user device 105 determines user intent based on image-captured user actions. For example, the user device 105 may ADD. Thus, the user device 105 may conserve computing resources, networking resources, and/or other resources that would have otherwise been consumed by generating poor insights associated with user browsing patterns, generating poor predictions of user intent based on the poor insights, providing incorrect recommendations to users due to the poor insights, providing incorrect recommendations to an online purchasing system due to the poor insights, and/or the like.

In this way, the user device 105 determines user intent based on image-captured user actions. For example, the user device 105 may automatically determine an intent of a user for use in conversational artificial intelligence for chatbots, virtual assistants, digital human bots, and/or the like, based on the user actions. The user device 105 may track actions of a single user or multiple users in the physical world or for any digital channel using machine learning models and using a single camera source (e.g., the camera 110). The user device 105 may utilize the intent to provide a virtual assistant (e.g., in stores) that promptly helps users by providing details about products and/or services, by easing the physical shopping experience via automatic addition to a cart, by promptly providing support in troubleshooting scenarios, and/or the like. Thus, the user device 105 may conserve computing resources, networking resources, and/or other resources that would have otherwise been consumed by failing to assist a user in a store with a product and/or a service, losing a business opportunity associated with a user in a store, failing to provide recommendations to a user of an online purchasing system due to poor insights, providing incorrect recommendations to a user of an online purchasing system due to the poor insights, and/or the like.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
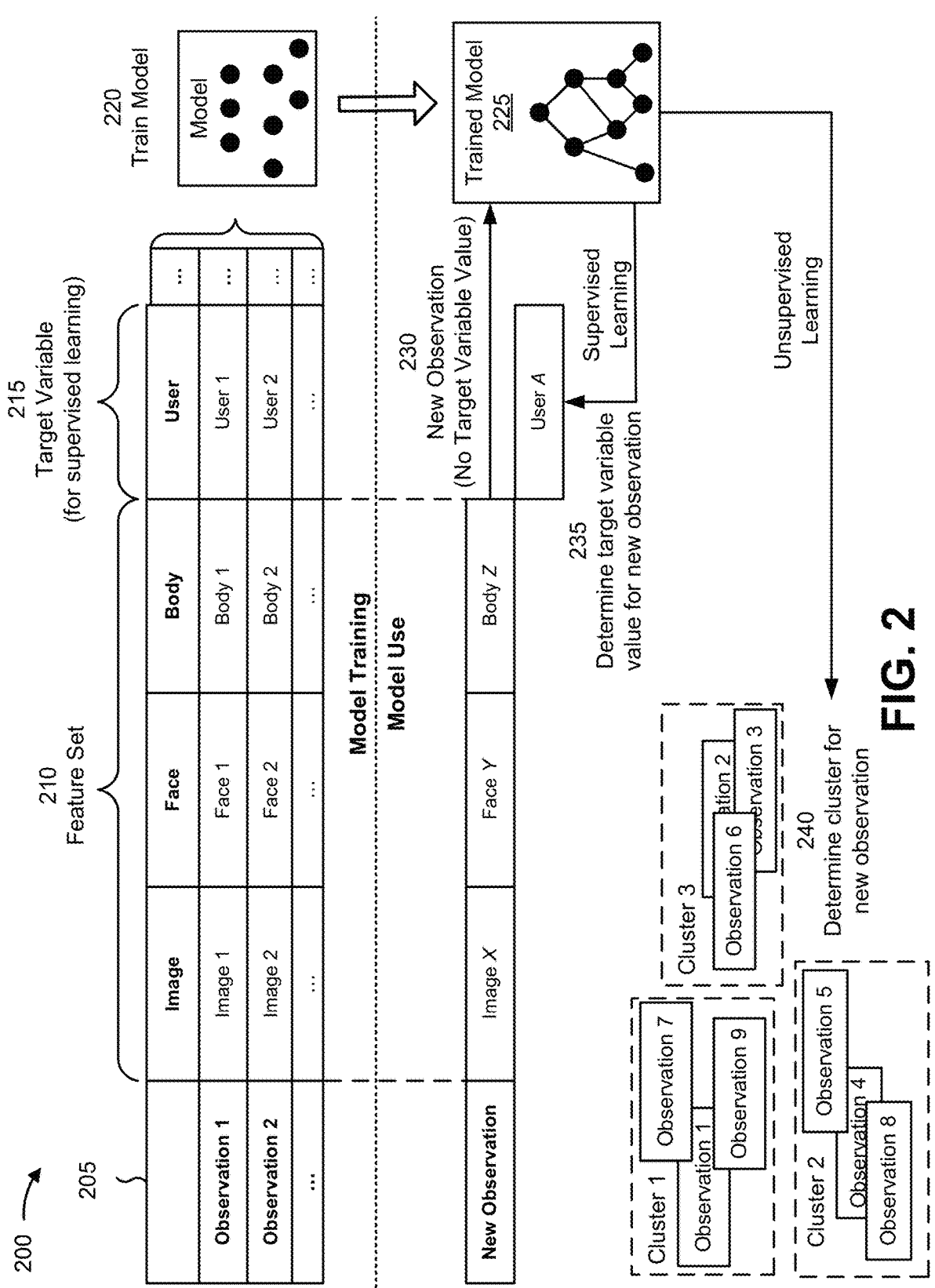
FIG. 2 is a diagram illustrating an example of training and using a machine learning model.

FIG. 2 is a diagram illustrating an example 200 of training and using a machine learning model to determine user intent based on image-captured user actions. The machine learning model training and usage described herein may be performed using a machine learning system. The machine learning system may include or may be included in a computing device, a server, a cloud computing environment, and/or the like, such as the user device 105 described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the user device 105, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the user device 105. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of an image, a second feature of a face, a third feature of a body, and/or the like. As shown, for a first observation, the first feature may have a value of image 1, the second feature may have a value of face 1, the third feature may have a value of body 1, and/or the like. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable may be labelled "user" and may include a value of user 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of image X, a second feature of coreference face Y, a third feature of body Z, and/or the like, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of user A for the target variable of the features for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., an image cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a face cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to determine user intent based on image-captured user actions. The machine learning system enables recognition and/or identification of tens, hundreds, thousands, or millions of features and/or feature values for tens, hundreds, thousands, or millions of observations, thereby increasing accuracy and consistency and reducing delay associated with determining user intent based on image-captured user actions relative to requiring computing resources to be allocated for tens, hundreds, or thousands of operators to manually determine user intent based on image-captured user actions.

As indicated above, FIG. 2 is provided as an example. Other examples may differ from what is described in connection with FIG. 2.

Figure 3:
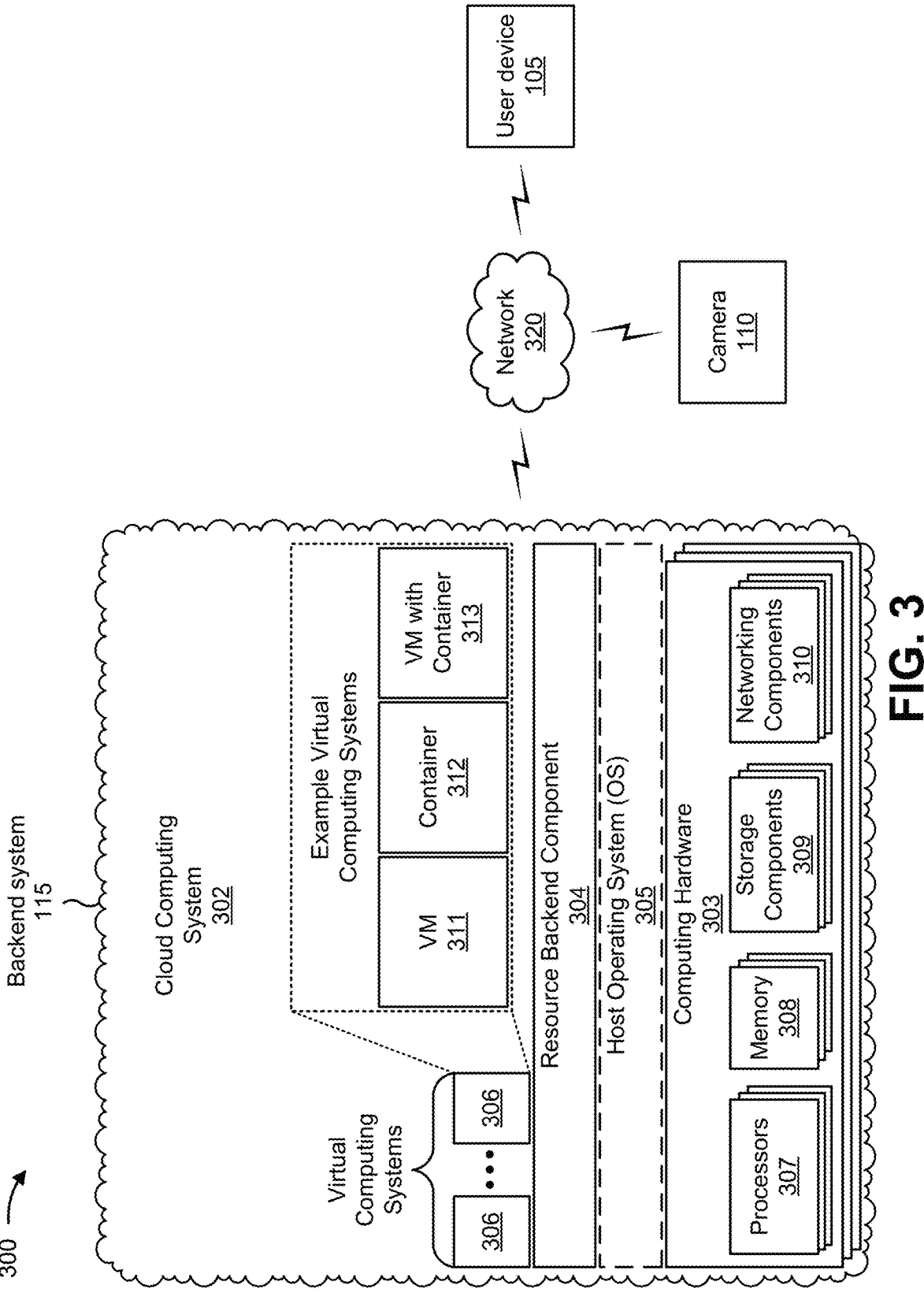
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include the backend system 115, which may include one or more elements of and/or may execute within a cloud computing system 302. The cloud computing system 302 may include one or more elements 303-313, as described in more detail below. As further shown in FIG. 3, the environment 300 may include the user device 105 and/or a network 320. Devices and/or elements of the environment 300 may interconnect via wired connections and/or wireless connections.

The user device 105 may include one or more devices capable of receiving, generating, storing, processing, and/or providing information, as described elsewhere herein. The user device 105 may include a communication device and/or a computing device. For example, the user device 105 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), a virtual assistant device, or a similar type of device.

The camera 110 may include one or more devices capable of receiving, generating, storing, processing, providing, and/or routing information, as described elsewhere herein. The camera 110 may include a communication device and/or a computing device. For example, the camera 110 may include an optical instrument that captures images, audio, and/or videos (e.g., images and audio). The camera 110 may feed real-time images and/or video directly to the user device 105 or the display of the user device 105, may record captured images and/or video to a storage device for archiving or further processing, and/or the like.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of the computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using the computing hardware 303. As shown, the virtual computing system 306 may include a virtual machine 311, a container 312, or a hybrid environment 313 that includes a virtual machine and a container, among other examples. The virtual computing system 306 may execute one or more applications using a file system that includes binary files, software libraries, and/or other resources required to execute applications on a guest operating system (e.g., within the virtual computing system 306) or the host operating system 305.

Although the backend system 115 may include one or more elements 303-313 of the cloud computing system 302, may execute within the cloud computing system 302, and/or may be hosted within the cloud computing system 302, in some implementations, the backend system 115 may not be cloud-based (e.g., may be implemented outside of a cloud computing system) or may be partially cloud-based. For example, the backend system 115 may include one or more devices that are not part of the cloud computing system 302, such as the device 400 of FIG. 4, which may include a standalone server or another type of computing device. The backend system 115 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
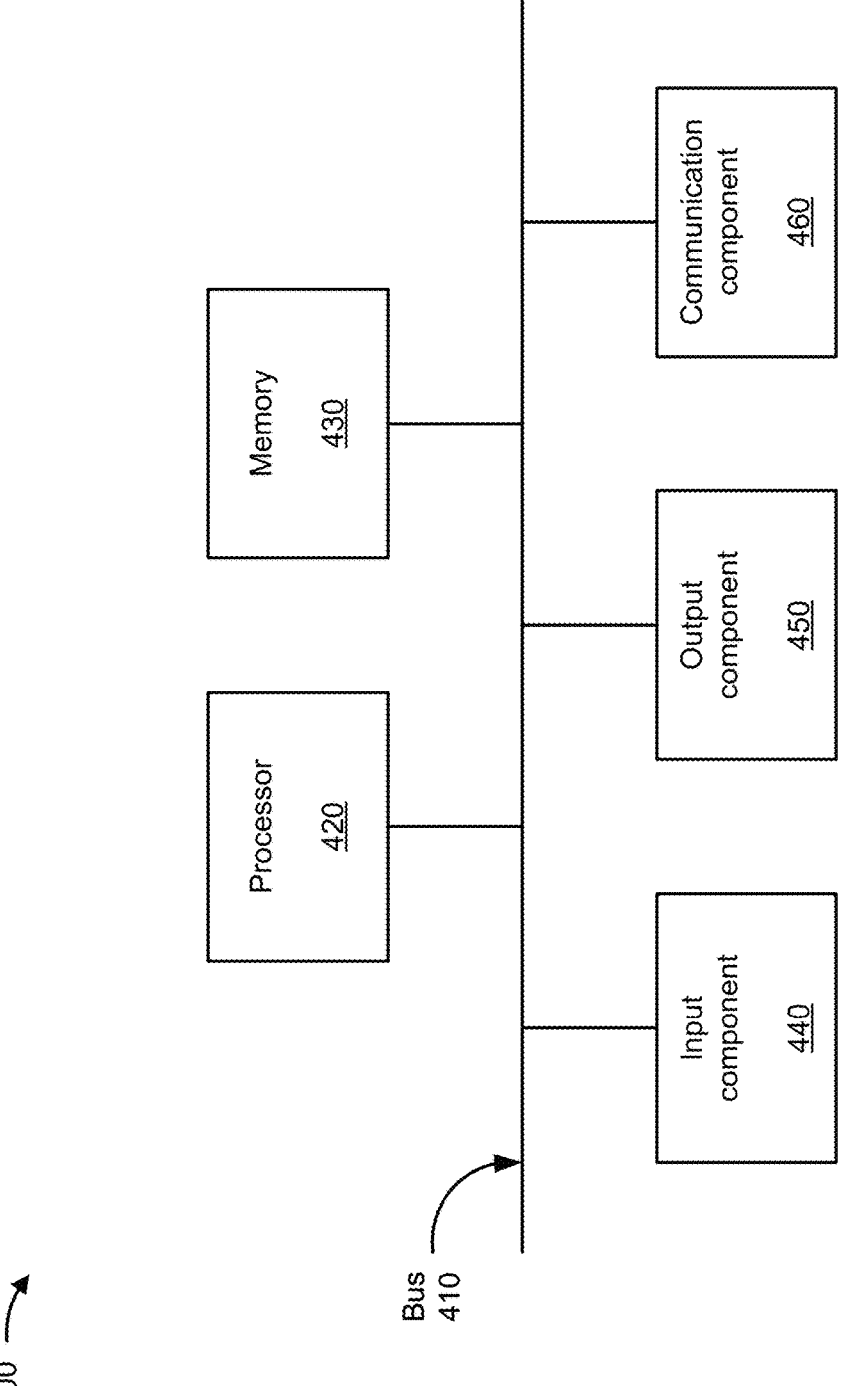
FIG. 4 is a diagram of example components of one or more devices of FIG. 3.

FIG. 4 is a diagram of example components of a device 400, which may correspond to the user device 105, the camera 110, and/or the backend system 115. In some implementations, the user device 105, the camera 110, and/or the backend system 115 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
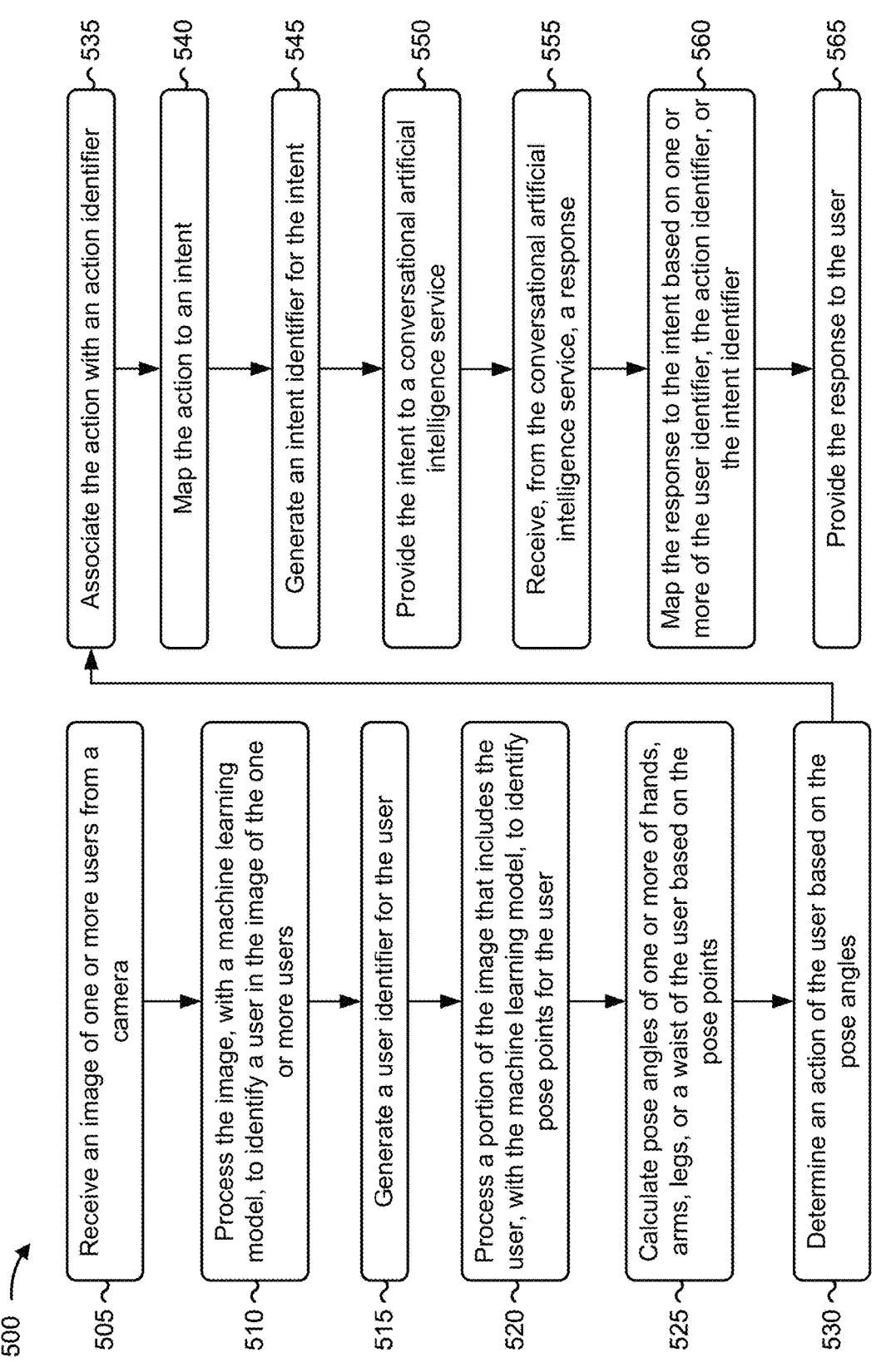
FIG. 5 is a flowchart of an example process for determining user intent based on image-captured user actions.

FIG. 5 is a flowchart of an example process 500 for determining user intent based on image-captured user actions. In some implementations, one or more process blocks of FIG. 5 may be performed by a device (e.g., the user device 105). In some implementations, one or more process blocks of FIG. 5 may be performed by another device or a group of devices separate from or including the device, such as a camera (e.g., the camera 110) and/or a backend system (e.g., the backend system 115). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving an image of one or more users from a camera associated with the user device (block 505). For example, the user device may receive an image of one or more users from a camera associated with the user device, as described above.

As further shown in FIG. 5, process 500 may include processing the image, with a machine learning model, to identify a user in the image of the one or more users (block 510). For example, the user device may process the image, with a machine learning model, to identify a user in the image of the one or more users, as described above.

As further shown in FIG. 5, process 500 may include generating a user identifier for the user (block 515). For example, the user device may generate a user identifier for the user, as described above. In some implementations, generating the user identifier for the user includes generating a unique number for the user identifier, determining points associated with shoulders of the user, calculating a midpoint of the points associated with the shoulders of the user, tracking movement of the midpoint for multiple time increments, determining whether the midpoint moved to a new midpoint for a threshold time based on tracking movement of the midpoint, and associating the new midpoint with the user identifier.

In some implementations, generating the user identifier for the use includes generating a unique number for the user identifier, determining points associated with shoulders of the user, calculating a midpoint of the points associated with the shoulders of the user, tracking movement of the midpoint for multiple time increments, and determining a current position of the user based on tracking movement of the midpoint.

As further shown in FIG. 5, process 500 may include processing a portion of the image that includes the user, with the machine learning model, to identify pose points for the user (block 520). For example, the user device may process a portion of the image that includes the user, with the machine learning model, to identify pose points for the user, as described above.

As further shown in FIG. 5, process 500 may include calculating pose angles of one or more of hands, arms, legs, or a waist of the user based on the pose points (block 525). For example, the user device may calculate pose angles of one or more of hands, arms, legs, or a waist of the user based on the pose points, as described above.

As further shown in FIG. 5, process 500 may include determining an action of the user based on the pose angles (block 530). For example, the user device may determine an action of the user based on the pose angles, as described above. In some implementations, determining the action of the user based on the pose angles includes determining, based on the pose angles, whether a left hand or a right hand of the user is picking up an object. In some implementations, determining the action of the user based on the pose angles includes determining, based on the pose angles, that the user is one of picking up a product or wearing a product.

As further shown in FIG. 5, process 500 may include associating the action with an action identifier (block 535). For example, the user device may associate the action with an action identifier, as described above.

As further shown in FIG. 5, process 500 may include mapping the action to an intent (block 540). For example, the user device may map the action to an intent, as described above. In some implementations, mapping the action to the intent includes determining that the user is located at a particular location for a time period, and mapping the action to the intent based on determining that the user is located at a particular location for a time period. In some implementations, the intent is associated with one or more of viewing an object, moving near an object, or picking up an object.

As further shown in FIG. 5, process 500 may include generating an intent identifier for the intent (block 545). For example, the user device may generate an intent identifier for the intent, as described above.

As further shown in FIG. 5, process 500 may include providing the intent to a conversational artificial intelligence service (block 550). For example, the user device may provide the intent to a conversational artificial intelligence service, as described above.

As further shown in FIG. 5, process 500 may include receiving, from the conversational artificial intelligence service, a response (block 555). For example, the user device may receive, from the conversational artificial intelligence service, a response, as described above. In some implementations, the response includes a response associated with one or more of a digital human, a chatbot, or a virtual assistant. In some implementations, the response is associated with an object located a predetermined distance from the user.

As further shown in FIG. 5, process 500 may include mapping the response to the intent based on one or more of the user identifier, the action identifier, or the intent identifier (block 560). For example, the user device may map the response to the intent based on one or more of the user identifier, the action identifier, or the intent identifier, as described above.

As further shown in FIG. 5, process 500 may include providing the response to the user (block 565). For example, the user device may provide the response to the user, as described above.

In some implementations, process 500 includes determining whether a dialog associated with the response is complete for the intent, and determining a new intent based on determining that the dialog associated with the response is complete. In some implementations, process 500 includes determining whether a dialog associated with the response is complete for the intent, and receiving one or more additional responses from the conversational artificial intelligence service based on determining that the dialog associated with the response is not complete.

In some implementations, process 500 includes processing the image, with the machine learning model, to identify one or more additional users in the image of the one or more users, and generating one or more additional user identifiers for the one or more additional users. In some implementations, process 500 includes prioritizing the user identifier and the additional user identifiers based on locations of the user and the one or more additional users.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, an image of one or more users from a camera associated with the device;
   processing, by the device, the image, to identify a user in the image of the one or more users;
   generating, by the device, a user identifier for the user;
   processing, by the device, a portion of the image that includes the user, to identify pose points for the user;

calculating, by the device, pose angles of one or more anatomical markers of the user based on the pose points;
   determining, by the device, an action of the user based on the pose angles;
   associating, by the device, the action with an action identifier;
   mapping, by the device, the action to an intent;
   generating, by the device, an intent identifier for the intent;
   providing the intent to a conversational artificial intelligence service when determining that the action and the intent of the user is sufficient to begin an artificial intelligence-based conversation with the user;
   generating a response based on the intent;
   mapping, by the device, the response to the intent based on one or more of the user identifier, the action identifier, or the intent identifier; and
   providing, by the device, the response to the user.

2. The method of claim 1, further comprising:
   determining whether a dialog associated with the response is complete for the intent; and
   determining a new intent based on determining that the dialog associated with the response is complete.

3. The method of claim 1, further comprising:
   determining whether a dialog associated with the response is complete for the intent; and
   receiving one or more additional responses from the conversational artificial intelligence service based on determining that the dialog associated with the response is not complete.

4. The method of claim 1, wherein mapping the action to the intent comprises:
   determining that the user is located at a particular location for a time period; and
   mapping the action to the intent based on determining that the user is located at a particular location for the time period.

5. The method of claim 1, further comprising:
   processing the image, with a machine learning model, to identify one or more additional users in the image of the one or more users; and
   generating one or more additional user identifiers for the one or more additional users.

6. The method of claim 5, further comprising:
   prioritizing the user identifier and the additional user identifiers based on locations of the user and the one or more additional users.

7. The method of claim 1, wherein generating the user identifier for the user comprises:
   generating a unique number for the user identifier;
   determining points associated with the anatomical markers of the user;
   calculating a midpoint of the points associated with the anatomical markers of the user;
   tracking movement of the midpoint for multiple time increments;
   determining whether the midpoint moved to a new midpoint for a threshold time based on tracking movement of the midpoint; and
   associating the new midpoint with the user identifier.

8. A device, comprising:
   one or more processors configured to:
      receive an image from a camera associated with the device;
      process the image, to identify a user in the image;
      generate a user identifier for the user;

process a portion of the image that includes the user, to identify pose points for the user;

calculate pose angles of one or more anatomical markers of the user based on the pose points;

determine an action of the user based on the pose angles;

associate the action with an action identifier;

map the action to an intent;

generate an intent identifier for the intent;

provide the intent to a conversational artificial intelligence service when determining that the action and the intent of the user is sufficient to begin an artificial intelligence-based conversation with the user;

receive, from the conversational artificial intelligence service, a response;

map the response to the intent based on one or more of the user identifier, the action identifier, or the intent identifier;

provide the response to the user;

determine whether a dialog associated with the response is complete for the intent; and determine a new intent based on determining that the dialog associated with the response is complete.

9. The device of claim 8, wherein the one or more processors, to determine the action of the user based on the pose angles, are configured to:

determine, based on the pose angles, whether a left hand or a right hand of the user is picking up an object.

10. The device of claim 8, wherein the one or more processors, to generate the user identifier for the user, are configured to:

generate a unique number for the user identifier;

determine points associated with shoulders of the user;

calculate a midpoint of the points associated with the anatomical markers of the user;

track movement of the midpoint for multiple time increments; and determine a current position of the user based on tracking movement of the midpoint.

11. The device of claim 8, wherein the intent is associated with one or more of:

viewing an object, moving near an object, or picking up an object.

12. The device of claim 8, wherein the response includes a response associated with one or more of:

a digital human, a chatbot, or a virtual assistant.

13. The device of claim 8, where the response is associated with an object located a predetermined distance from the user.

14. The device of claim 8, wherein the one or more processors, to determine the action of the user based on the pose angles, are configured to:

determine, based on the pose angles, that the user is one of picking up a product or wearing a product.

15. A non-transitory computer-readable medium storing a set of instructions, the set of instructions comprising:

one or more instructions that, when executed by one or more processors of a device, cause the device to:

receive an image from a camera associated with the device;

process the image, to identify a user in the image;

generate a user identifier for the user;

process a portion of the image that includes the user, to identify pose points for the user;

calculate pose angles of one or more anatomical markers of the user based on the pose points;

determine an action of the user based on the pose angles;

associate the action with an action identifier;

map the action to an intent, wherein the intent is associated with one or more of viewing an object, moving near an object, or picking up an object;

generate an intent identifier for the intent;

provide the intent to a conversational artificial intelligence service when determining that the action and the intent of the user is sufficient to begin an artificial intelligence-based conversation with the user;

receive, from the conversational artificial intelligence service, a response;

map the response to the intent based on one or more of the user identifier, the action identifier, or the intent identifier; and provide the response to the user.

16. The non-transitory computer-readable medium of claim 15, wherein the one or more instructions further cause the device to:

determine whether a dialog associated with the response is complete for the intent; and selectively:

determine a new intent based on determining that the dialog associated with the response is complete; or receive one or more additional responses from the conversational artificial intelligence service based on determining that the dialog associated with the response is not complete.

17. The non-transitory computer-readable medium of claim 15, wherein the one or more instructions, that cause the device to map the action to the intent, cause the device to:

determine that the user is located at a particular location for a time period; and map the action to the intent based on determining that the user is located at a particular location for a time period.

18. The non-transitory computer-readable medium of claim 15, wherein the one or more instructions further cause the device to:

process the image, with a machine learning model, to identify one or more additional users in the image;

generate one or more additional user identifiers for the one or more additional users; and prioritize the user identifier and the additional user identifiers based on locations of the user and the one or more additional users.

19. The non-transitory computer-readable medium of claim 15, wherein the one or more instructions, that cause the device to determine the action of the user based on the pose angles, cause the device to:

determine, based on the pose angles, whether a left hand or a right hand of the user is picking up an object.

20. The non-transitory computer-readable medium of claim 15, wherein the response includes a response associated with one or more of:

a digital human, a chatbot, or a virtual assistant.

* * * * *